United States Patent [19]

Pierce

[11] Patent Number: 4,620,689

[45] Date of Patent: Nov. 4, 1986

[54] HYDRAULIC CONCENTRATOR

[76] Inventor: Edward J. Pierce, P.O. Box 506, Morro Bay, Calif. 93442

[21] Appl. No.: 730,758

[22] Filed: May 3, 1985

Related U.S. Application Data

[62] Division of Ser. No. 573,056, Jan. 23, 1984, Pat. No. 4,529,508.

[51] Int. Cl.[4] .......... F16L 55/14

[52] U.S. Cl. .......... 251/7; 251/4

[58] Field of Search .......... 251/4, 7, 8, 10

[56] References Cited

U.S. PATENT DOCUMENTS

| | | | |
|---|---|---|---|
| 2,796,228 | 6/1957 | Kelly | 251/7 |
| 3,262,670 | 7/1966 | Marlett | 251/7 |
| 3,511,469 | 5/1970 | Bell | 251/7 |
| 3,570,803 | 3/1971 | Cokeley et al. | 251/7 |
| 4,286,618 | 9/1981 | Bang et al. | 251/7 |

*Primary Examiner*—Martin P. Schwadron
*Assistant Examiner*—Sheri M. Novack
*Attorney, Agent, or Firm*—Daniel C. McKown

[57] ABSTRACT

The invention includes a concentrator that pressurizes and provides an enriched liquid suspension to a separator. In the concentrator, the incoming liquid suspension is driven by a diaphragm pump into a funnel-shaped accumulator that is closed at its top. Some of the heavier particles go directly to the bottom of the accumulator, but the lighter particles and the remainder of the suspension are forced to flow through tubes that extend from the top of the accumulator upward on a helical path. Further particulate matter settles out in the helical passages and migrates to the bottom of the accumulator. From the accumulator, the concentrated suspension is fed under pressure to a separator that includes an inclined chamber that is completely filled with liquid. A stream of wash water is directed from the lower rear end of the separator towards the upper front end of the separator. An island in the separator includes a rearwardly opening passage through which the enriched suspension from the concentrator enters the separator. The floor and ceiling of the separator chamber define between them an undulating passage from the back end to the front end of separator. The separated material is discharged from the separator through a unique pinch valve, while the wash water and finer particles are forced from the front end of the separator chamber through an upwardly directed helical path which provides further separation.

3 Claims, 4 Drawing Figures

HYDRAULIC CONCENTRATOR

This is a division of application Ser. No. 573,056 filed Jan. 23, 1985 now U.S. Pat. No. 4,529,508, July 16, 1985.

BACKGROUND OF THE INVENTION

1. Field of the Invention

The present invention is in the field of ore refining and more specifically relates an apparatus for concentrating and recovering concentrates from an ore mixture.

2. The Prior Art

The present invention includes improvements and additions to the apparatus described in an earlier patent of the present inventor, namely U.S. Pat. No. 2,832,472, issued Apr. 29, 1958 to E. J. Pierce for "Hydraulic Concentrator". Because portions of the structure of the present invention are similar to portions of the invention disclosed in the earlier patent, the earlier patent is hereby incorporated by reference into the present specification, and will be referred to below as "the earlier patent".

The earlier patent disclosed an inclined reciprocating sluiceway within which a primary flow of water directed up the sluiceway commingles with the mix in a mixing zone located at a point intermediate the ends of the sluiceway. After passing through the mixing zone, the mix is intermingled with a secondary stream or flow which also flows up the incline. As the combined flow moves up the incline, its average velocity decreases, thereby causing the heavier concentrates to settle out onto the floor of the sluiceway. The heavier concentrates then move along the floor of the sluiceway down the incline as a result of the oscillation of the sluiceway. The heavier concentrates thus accumulate at the lower rear end of the sluiceway, while the liquid and the lighter material are discharged from the higher front end of the sluiceway. The angle of inclination of the sluiceway is adjustable.

In contrast to the invention disclosed in the earlier patent, the present invention uses only a single flow of water rather than a primary flow and a secondary flow. Because only a single flow is used in the present invention, it is possible to eliminate the baffle that in the earlier invention separated the primary flow from the secondary flow and defined the mixing zone.

In contrast with the earlier invention, in the present invention an entirely new feed geometry and mixing zone is used. This is made possible by pressurizing the feed as well as by structural additions to the separation chamber.

Further in contrast to the earlier invention, in the present invention the plan view of the interior of the separation chamber has been greatly altered to improve its performance, as will be described in detail below.

In contrast with the earlier invention, in the present invention the separation chamber includes a novel pinch valve that opens intermittently for discharging the heavier concentrates.

The concentrator of the earlier invention used a flat floor in its separation chamber. In contrast, in the present invention, both the floor and ceiling of the separation chamber are shaped by the addition of a number of specially positioned blocks that eliminate any tendency of the heavier concentrates to pack and make possible a more accurate separation.

These are the principal structural differences between the present invention and that of the earlier patent, and the operation and significance of these improvements will be described in greater detail below.

In addition to the aforementioned improvements, the present invention includes an additional novel helical concentrator that cooperates with the separation chamber of the present invention to effect a preliminary concentration of the material to be separated and to provide a pressurized feed for the separator stage.

A form of helical concentrator known in the prior art is manufactured by Humphreys Mineral Industries, Inc., 2219 Market Street, Denver, Colo. 80205 and is sold under the trademark HYDROCYCLONE. That unit is quite different from the present invention in that the material is fed into the spiral passage from the top, and spirals down through the passage under the action of gravity, while, in contrast, in the present invention the material to be concentrated is forced to flow upwardly against gravity through a helical passage.

Thus, as will be seen below, the present invention includes novel improvements and other features that permit it to be distinguished readily from concentrators and separators known in the prior art.

SUMMARY OF THE INVENTION

The present invention includes a concentrator that performs a prelimary concentrating action on a mixture and further includes a separator that includes an inclined and reciprocating separation chamber.

In the preferred embodiment shown in FIG. 1, the prelimary concentrator stage includes a diaphragm pump that draws a mixture to be concentrated from a supply reservoir and drives the incoming liquid through a pipe to a funnel-shaped apparatus. The incoming liquid enters the funnel-shaped apparatus at the center of its top and some of the heavier concentrates fall to the bottom of the funnel-shaped apparatus.

Some of the less heavy ore concentrates are driven by the pump to flow out of the funnel-shaped apparatus through one of a number of tubes that communicate with the interior of the funnel-shaped apparatus near its top and that are spaced circumferentially around the top of the funnel-shaped apparatus.

These circumferentially spaced tubes then spiral upwardly and eventually join a return line that can be directed either to the feed reservoir or to a discharge.

With each pulse of the diaphragm pump, the mix is forced upwardly in the helical tubes, but during the interval between successive strokes of the diaphragm pump the mix in the helical tubes tends to come to rest. Thus, the motion of the liquid in the helical tubes can be described as progressing up the tubes in a succession of spaced surges. As the liquid progresses up the tubes, the heavier concentrates are deposited in the helical tubes, and the deposited material tends to flow or migrate down the helical tubes and into the funnel-shaped apparatus.

The lower end of the funnel-shaped apparatus leads to the inlet of the reciprocating inclined separation chamber. Liquid and concentrates from the funnel-shaped apparatus is thus forced under pressure into the separation chamber.

The separation chamber includes a divider that extends from the floor to the ceiling of the chamber. The divider includes a rearwardly-opening notched portion into which the incoming mixture is fed. Thus, the notched portion of the divider opens in a direction opposite to the direction of flow of the washing water within the separation chamber. If it were not for the pressurization of the incoming fed from the preliminary concentrator, the incoming liquid mixture would be confined by the washing flow within the separation chamber to remain within the notched portion. However, because of the pressure under which the mix is fed into the separation chamber, the mix is forced to commingle with the wash stream, and the lighter concentrates are swept along with the wash stream, while the heavier concentrates move rearwardly within the separation chamber to accumulate near the rear end of it.

In addition to the notched divider, the separation chamber is noteworthy in several other respects. The side walls of the separation chamber are not parallel, but instead converge and diverge for the purpose of controlling the velocity of flow at various points along the separation chamber.

The separation chamber is also noteworthy in that its floor and ceiling are not flat, but instead both the floor and ceiling of the separation chamber include spaced inserts that create variations in the local flow velocity and that prevent the concentrate material from packing.

The concentrated material accumulates near the rear of the separation chamber and is discharged through a novel valve. Meanwhile, the wash water along with the lighter components of the mix are driven to the topmost end of the separation chamber and are conducted from the separation chamber through an upwardly spiraling tube. Some of the material is deposited on the inside walls of the spiral tube and eventually migrates back down and into the separation chamber. The remainder of the wash water is conducted from the top of the spiral to a drain.

The valve through which the concentrates are discharged at the lower end of the separation chamber would be called a pinch valve or guillotine type of valve. A piece of surgical rubber tubing in the preferred embodiment is connected to the discharge port of the separation chamber, and this tube is inserted through an opening in the pinch valve. The pinch valve includes a sliding plate member and a stationary member. The hose is normally pinched between the stationary member and the slidable plate member through the use of a spring that biases the slidable member against the hose. The slidable member is connected by means of a chain to a stationary portion of the apparatus so that when forward motion of the separation chamber pulls on the chain, the biasing force of the spring is overcome thereby permitting the concentrates to flow out of the separation chamber through the tube. When the separation chamber lurches forward during its reciprocation, the concentrates are forced to move toward the discharge port, and the pinch valve opens at that time to permit discharge of the concentrates into a bucket.

The operation of the separation chamber under the pressure provided by the preliminary concentrator permits the use of a spiral concentrator at the upper end of the separation chamber, permits injection of the preconcentrated mixture in a direction counter to the flow of the wash water within the separation chamber, and also permits the concentrates to be discharged from the separation chamber under pressure.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
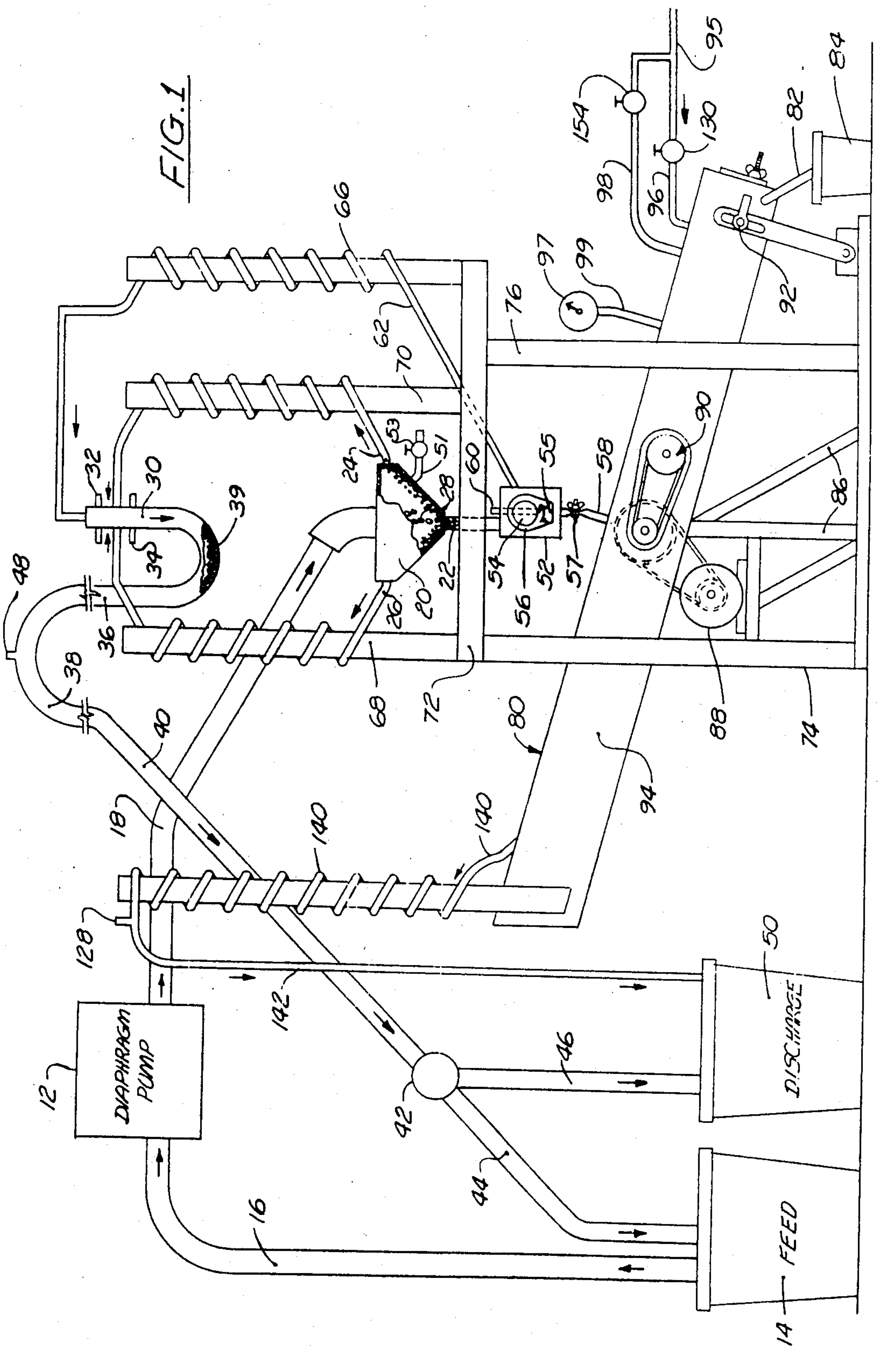
FIG. 1 is a schematic diagram showing a side view of a preferred embodiment of the hydraulic concentrator of the present invention.

Turning now to the drawings in which like parts are denoted by the same reference numeral throughout, the schematic diagram of FIG. 1 presents a side elevation view of the entire apparatus of the present invention and shows the general layout of the total system.

As shown in FIG. 1, the material to be concentrated and separated is assumed to be available from a feed reservoir 14. The feed reservoir 14 is shown in the drawing as a container, but in other embodiments it may be a tank or reservoir. Typically, the material in the feed reservoir has already passed through one or more stages of processing such as crushing, washing, screening, or pulverizing. The material to be concentrated is suspended in a liquid, typically water.

The diaphragm pump 12 draws the suspension through the intake line 16 and forces the suspension through the line 18 under pressure. As is generally known, a diaphragm pump is highly advantageous for this type of operation, since the suspended material does not come in contact with critical portions of the pump, as it would in certain other types of pump, and therefore the diaphragm pump is the most reliable way of pressurizing the suspension. In a preferred embodiment, the diaphragm pump 12 is driven by a small internal combustion engine (not shown). As is generally known, a diaphragm pump supplies liquid in a series of surges, so that the flow in the line 18 might be described as a pulsating unidirectional flow.

The line 18 carries the suspension to the funnel-shaped accumulator 20. About 30 cm before reaching the funnel-shaped accumulator, the line 18, which is about 5 cm inside diameter as it leaves the pump 12, enlarges to about 7.6 cm inside diameter, to reduce the flow velocity, to avoid excessive turbulence in the accumulator. As shown in FIG. 1, the funnel-shaped accumulator is oriented with its axis vertical, and with its outlet line 22 directed downwardly. The line 18 opens into the funnel-shaped accumulator 20 at the center of its closed top. The heavier particles 28 tend to migrate toward the outlet line 22 and the lower end of the accumulator 20.

When the concentrator is operating in its normal mode, some of the suspension that enters the funnel-shaped accumulator 20 passes out through the outlet line 22 along with the heavier particles 28, but only a fraction of the incoming liquid is thus disposed of. The remainder of the incoming liquid is forced to flow through the tubes 24, 26 that open into the uppermost portion of the accumulator at locations spaced around its circumference. The tubes 24, 26 are typical of a number of such tubes. In accordance with the preferred embodiment, the number of tubes used is always more than the minimum number required to accommodate the flow through the line 18. This reduces the flow velocity in the tubes, thereby promoting separation. In a preferred embodiment, there are 24 tubes exemplified by the tubes 24, 26. As shown in FIG. 1, the tubes 24, 26 are wound around the uprights 70, 68 respectively in a helical array.

It should be noted that when the concentrator is in operation, the line 18, the funnel-shaped accumulator 20 and the tubes 24, 26 are completely filled by the liquid which surges forward and then pauses, only to surge forward again on the next stroke of the pump 12.

As the liquid progresses on its helical path through the tubes 24, 26, some of the heavier remaining particles in the suspension deposit on the walls of the tubes 24, 26 under the combined action of gravity and centrifugal force. Those particles gradually progress downwardly through the helical tube and eventually find their way back to the funnel-shaped accumulator 20.

At their upper ends, the tubes 24, 26 enter into the shorter leg 30 of a J-shaped line whose longer leg 36 extends upward several feet before turning around and descending as the line 40. A vent 48 is placed at the top of the upper portion 38 of the line. The purpose of the vent is to prevent syphoning action through the line 40. The height of the longer leg 36 serves to enhance the hydrostatic pressure that is brought to bear in the funnel-shaped accumulator 20 and in the separator 80. A number of nipples, of which the nipples 32, 34 are typical, are provided on the shorter leg 30 of the J-shaped line to receive the other tubes of which the tubes 24, 26 are typical.

If the tubes 24, 26 had been connected to the longer leg 36 of the J-shaped line, there would have been a possibility that some of the heavier particles would have settled in that leg of the line, where they might eventually accumulate to such an extent as to block some of the tubes. This problem was solved through the use of the J-shaped line with the tubes entering the shorter leg 30 so that the full rush of liquid can be brought to bear on any particles that may tend to settle, such as the particles 39, to sweep them up and over the upper portion 38 of the line and down into the line 40.

A valve 42 is provided in the line 40 to permit the liquid in the line 40 to be routed either through the line 44 to the feed reservoir 14 or through the line 46 to the discharge tank 50. If the concentrator has been operated for a while and then is turned off, there is a possibility under some conditions that a sufficient quantity of particles will settle out to clog certain passages. The provision for clearing the particles 39 from the J-shaped line was described above. It is also possible that particles might clog the funnel-shaped accumulator 20 and its outlet line 22. To prevent this from happening, the funnel-shaped accumulator 20 is provided with a flushing line 51 and a valve 53 through which flushing water can be directed into the funnel-shaped accumulator 20. It is necessary that the accumulator 20 be sealed to withstand the operating pressure, and therefore the use of the flushing line 51 is the only practical way of preventing clogging.

With each successive surge of liquid through the line 18, whatever particles have settled in the bottom of the funnel-shaped accumulator 20 are propelled through the outlet line 22 and into the feeder 52. The feeder 52 has a hollow space 55 within it and with which the lines 22, 58 and 62 communicate. The hollow space 55 surrounds a solid cylindrical plug 54 so that the hollow space 55 has a uniform cross-section that is generally annular in shape. The valve 57 includes a spring clamp that pinches the hose 58 with a preset force which is adjusted to permit concentrates to pass during only a part of each cycle of the diaphragm pump 12. However, under certain conditions of operation it may be desirable to partially or completely close the valve 57. For example, if the separator 80 could not handle the full quantity of concentrates being supplied through the line 58, it might be desirable to partially close the valve 57. When the valve 57 is partially or completely closed, the lines 62, 66 serve as a bypass for the concentrated material. On the other hand, when the valve 57 is open, the concentrates flow from the outlet line 22 into the passage 56 to the hollow space 55 and then out through the hose 58. A hose 58 is used to connect the feeder 52 to the separator 80 because the inlet to the separator 80 is reciprocating in the lengthwise direction.

As mentioned above, the separator 80 of the present invention is an outgrowth and improvement upon the separator disclosed in U.S. Pat. No. 2,832,472 issued Apr. 29, 1958 to the present inventor.

The separator of the present invention has in common with the separator described in the earlier patent a frame 86 that supports the separator, an electric motor 88 that drives the reciprocation mechanism 90, and a tilt adjustment 92 for altering the angle of inclination of the separatzon chamber. As shown in FIG. 1, the concentrator described above and the separator 80 are structurally integrated through the provision of a platform 72 that is supported on the legs 74, 76 and that supports the uprights 68, 70 as well as the other components that make up the concentrator.

In the following paragraphs, the structure and operation of the separator 80 will be described with particular emphasis on those aspects of it that are deemed to be patentable improvements over the separator disclosed in the earlier patent.

Figures 2, 3:
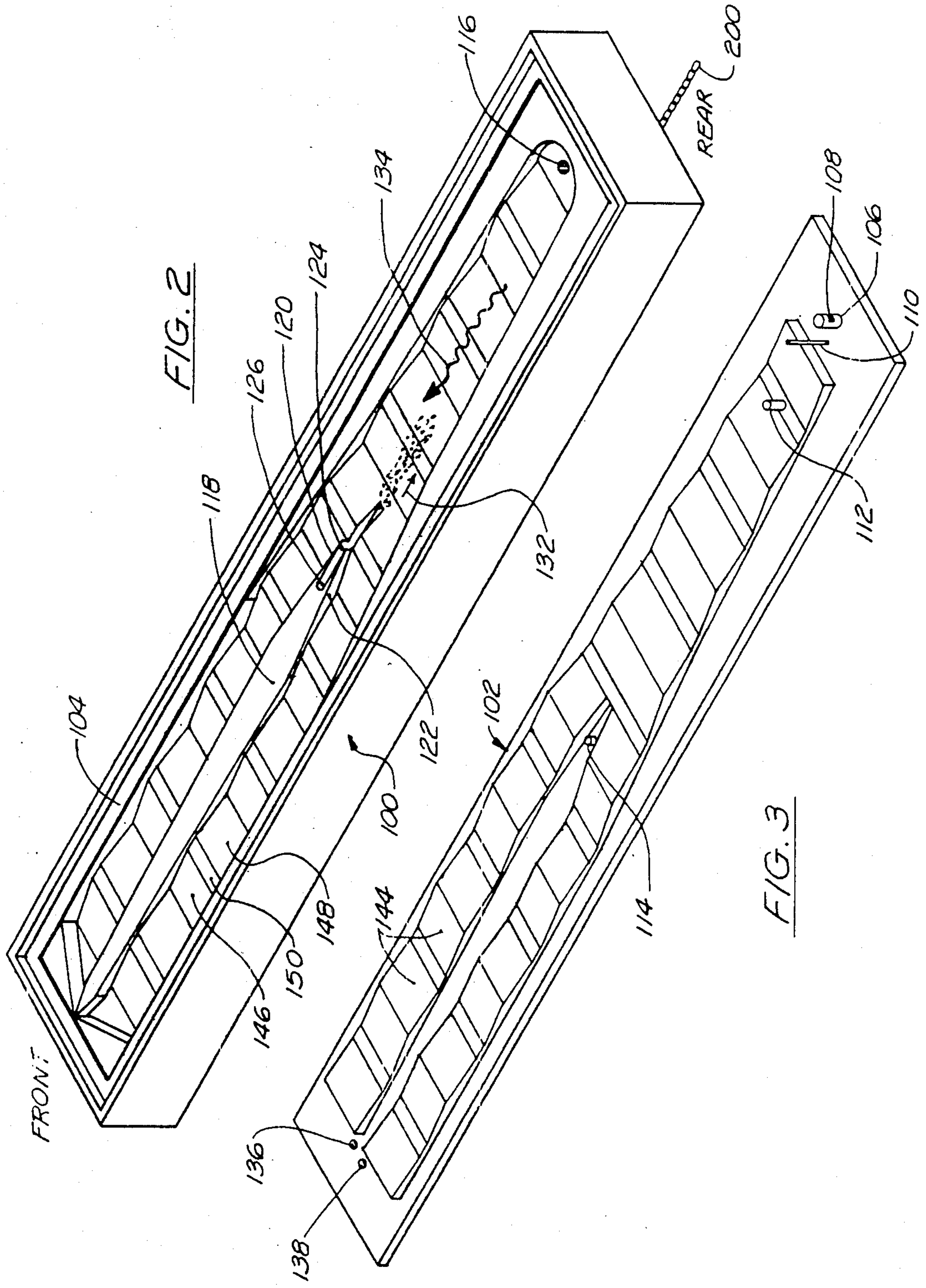
FIG. 2 is a perspective view of the separation chamber used in a preferred embodiment of the present invention with its lid removed.
FIG. 3 is a perspective view showing the lid of the separation chamber in a preferred embodiment; and, FIG. 4 is an exploded perspective view showing a pinch valve used in a preferred embodiment of the invention.

As shown most clearly in FIG. 5 of the earlier patent, the separation chamber shown in FIGS. 2 and 3 herein reciprocates in its longitudinal direction within a carriage structure 94. Also, as in the earlier patent, the angle of tilt of the separator and the amplitude of the reciprocating motion of the separation chamber are independently adjustable. As shown in FIG. 1 herein, water from a supply line 95 supplies the washing water for the operation of the separation chamber through the feed water hose 96. Also connected to the supply line 95 is a flush water hose 98 that is used to clear the outlet for the concentrates in the event that outlet becomes clogged by packing of concentrated material. A pressure gauge 97 is used for monitoring the pressure within the separation chamber, and the pressure gauge communicates with the chamber through the pressure gauge hose 99.

Turning now to FIGS. 2 and 3, which together show the separation chamber 100 with its lid 102 removed, it is seen that the lid 102 fits within the walls of the separation chamber and is drawn against the gasket 104 by bolts (not shown) to render the chamber watertight even when it is pressurized. The feed water hose 96 of FIG. 1 is connected to the feed water inlet fixture 106 that includes an orifice 108 that directs the incoming water toward the closed rear end of the chamber. This indirect feed of the wash water reduces extreme velocities and provides a more uniform current of water that flows generally from the rear end of the separation chamber to the front end, as indicated by the arrow 134.

The flush water hose 98 is connected to the flush fixture 110 of FIG. 3 to supply a downwardly directed high velocity stream of water for the purpose of breaking up any compaction of the concentrates that might develop at the rear end of the chamber.

The pressure gauge hose 99 is attached to the pressure gauge fixture 112, and the concentrate feed hose 58 of FIG. 1 is attached to the feed fixture 114.

As in the separator of the earlier patent, the lid 102 includes portions defining windows (not shown) that permit the operator to adjust the tilt and the volume of water to bring about an absence of air bubbles or air spaces within the chamber.

The concentrate outlet fixture 116 is visible near the rear end of the separation chamber.

As seen in FIG. 2, the width of the space within the separation chamber 100 varies from a narrow width at the rear end to a relatively wide width at the front end. This provides a gradually decreasing flow velocity as the wash water travels from the rear end toward the front end. Unlike the separator described in the earlier patent, the present separator uses only a single flow of water.

A noteworthy feature of the present separation chamber, and one which distinguishes it from the separation chamber of the earlier patent is the feed system employed. As described above, the concentrator supplies to the separator an enriched mixture of water and concentrates. The enriched mixture is supplied under pressure through the hose 58 that is connected to the feed fixture 114 that communicates with the space within the separation chamber 100.

The separation chamber 100 includes an island 118 that extends longitudinally from the front of the chamber toward the rear of the chamber. At the end of the island 118 that is nearest the rear of the chamber, the island forks into two branches 120, 122 that include between them a rearwardly opening space 124. It is into the front-most end 126 of the space 124 that the feed fixture 114 extends and supplies the concentrated mixture under pressure. Because the vent 48 is at a higher elevation than the vent 128, as seen in FIG. 1, the hydrostatic pressure of the concentrate mixture in the hose 58 is greater than the pressure of the liquid within the separation chamber, the concentrate mixture is injected into the space 124. As increasing quantities of the concentrate mixture are injected into the space 124, the concentrate mixture eventually overflows the space 124 in the rearward direction and thus becomes mixed with the wash water that is flowing from rear to front. The heavier particles of the concentrated mixture proceed rearwardly, but the lighter particles are swept toward the front of the separation chamber by the flow of wash water. The volume of the wash water is set by the position of the valve 130.

This feed system is a distinct advantage over the feed system employed in the separator of the earlier patent in that the heavier particles are not propelled forward in the chamber, but instead proceed directly toward the rear of the chamber. Also, the baffle used in the earlier separator to separate the primary flow from the secondary flow has been eliminated.

Thus, in the present invention the heavier particles of concentrate migrate along the floor of the separation chamber 100 as indicated by the arrow 132, counter to the direction of the flow of wash water indicated by the arrow 134. The lighter particles of concentrates are swept toward the front of the separation chamber by the flow of wash water and as they flow toward the front, most of them settle out of suspension onto the floor of the chamber, so that only the very finest particles reach the front end of the chamber.

In accordance with the present invention, even these very finest particles are treated by a helical separator as indicated in FIG. 1. Discharge fixtures 136, 138, visible at the front end in FIG. 3 extend into the space within the separation chamber and provide an outlet for the wash water and the very finest particles that remain suspended in it. The hose 140 of FIG. 1 is connected to the discharge fixture 136 of FIG. 3, and the hose 140 is wrapped about the leg 74 to form a helical path for the discharge water. This helical path gives the very finest suspended particles a final opportunity to settle out before being discharged via the hose 142 into the discharge tank 50. The vent 128 prevents siphoning and also insures that the pressure in the separation chamber 100 is less than the pressure in the tube 58. Whatever concentrates settle out in the hose 140 eventually migrate back into the separation chamber and migrate along its floor toward the rear end. A similar helical concentrator is attached to the discharge fixture 138 in the preferred embodiment.

Another noteworthy distinction between the present invention and the separator described in the earlier patent lies in the use of a number of blocks 144 that are bonded to the floor and the ceiling of the separation chamber. A careful study of FIGS. 2 and 3 shows that the blocks on the floor of the separator are staggered with respect to those on the ceiling of the separator so as to define an undulating path of substantially constant height that extends from the front to the rear of the separation chamber. The undulations of the floor and ceiling of the chamber are not riffles, and do not act in the same manner that riffles do. It must be remembered that a riffle box is never completely filled with water, whereas the separation chamber of the present invention is always filled with water. Accordingly, in the chamber of the present invention, surface tension effects are totally eliminated, thereby permitting a much more sensitive and accurate separation to be obtained.

The main purpose of the use of the blocks 144 to define an undulating path from the front to the rear of the separation chamber is to separate the material on the floor into successive zones, thereby preventing the entire weight of the material from bearing directly on the material at the rear end of the chamber, so as to stop any tendency toward packing of the material. As the entire separation chamber reciprocates, the water within it, unlike the water in a riffle box, is constrained to move with the chamber, but the concentrates on the floor of the chamber tend to remain fixed in space due to their inertia. Accordingly, as the separation chamber lurches forward, the concentrates appear to move rearwardly with respect to the floor of the chamber. The blocks are symmetrical in shape so that the face 146 has the same slope as the face 148. However, because of the inclination of the separation chamber, the slope of the rearwardly rising face 146 is decreased while the slope of the frontwardly rising face 148 is increased. Accordingly, when the separator lurches forward, the particles on the floor of the chamber can easily move in the rearward direction over the face 150 that separates the faces 146, 148. However, when the separator next lurches rearwardly, the particles do not find it so easy to migrate back up the face 148. In this manner, rearward migration of the particles is favored, but at the same time, the bed of particles is broken up into a succession of bunches of particles, to reduce packing.

Three different types of separating action are believed to occur at the three faces 146, 148 and 150, respectively, as a result of the three different inclinations presented by the faces at any phase of the reciprocation.

In the preferred embodiment, the blocks 144 are composed of a transparent plastic material that permits conditions within the chamber to be monitored through windows in the lid of the chamber.

Provision must be made for discharging the concentrates that accumulate at the rear end of the separation chamber. Because the chamber is pressurized, the outlet mechanism must operate without adversely affecting the pressurization of the separation chamber. Since any discharge from the chamber necessarily will reduce the pressure somewhat, a practical design goal is to devise a concentrate discharge device that maximizes the quantity of concentrates discharged while minimizing loss of chamber pressure. I have achieved this design goal through the use of the novel pinch valve shown in FIG. 4.

The concentrate outlet fixture 116 is screwed into the bottom of the separation chamber as shown in FIG. 2. The flush water fixture 110, also shown in FIG. 3, is directed into the conical space 152 within the concentrate outlet fixture 116. The conical shape of the fixture 116 tends to funnel the accumulated concentrates into the pinch valve. In the event the concentrates become packed in the conical space 152, the valve 154 is opened briefly, which permits a jet of water to be directed by the flush water fixture 110 into the conical space 152.

Figure 4:
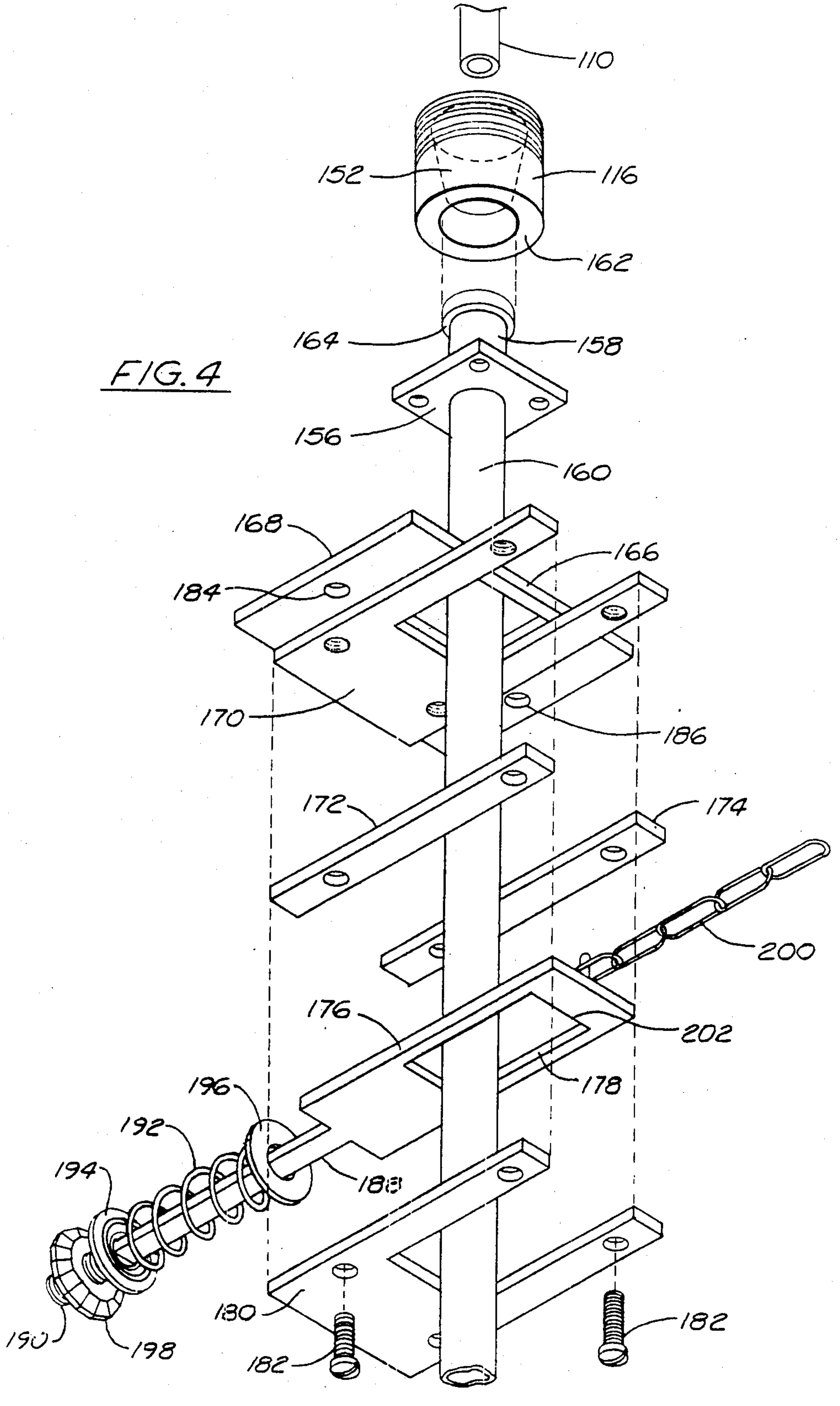

The pinch valve of FIG. 4 is mounted to the underside of the separation chamber 100 by means of screws.

In a preferred embodiment of the invention, there is provided a plate 156 from which a metal tube 158 extends in a direction perpendicular to the plate. The inside diameter of the metal tube 158 is only slightly larger than the outside diameter of the rubber hose 160. In the preferred embodiment, a rubber hose 160 is inserted through the metal tube 158, and the metal tube is inserted into the concentrate outlet fixture 116 until the plate 156 is flush with the lower end 162 of the fixture 116. Next, a short length of the rubber hose 160 is pulled upward through the metal tube 158, and the end 164 of the rubber hose 160 is then reverted over the end of the metal tube 158 in the manner shown in FIG. 4. The end 164 of the rubber hose 160 then serves as a seal, since it is drawn against the conical inside surface of the fixture 116.

The plate 156 fits into the rectangular hole 166 in the plate 168 to provide a flush surface against which the U-shaped plate 170 lies. The slider 176 slides between the plate 170 and the U-shaped plate 180, on its top and bottom, and is constrained in the lateral direction by the guides 172, 174. The assembly consisting of the plate 170, the guides 172, 174 and the plate 180 are held in contact by the screws 182. The assembly is then bolted to the bottom of the separator by screws (not shown) that pass through the holes 184, 186. The slider 176 includes a tang 188 that terminates in a threaded shank 190. A compression spring 192 is placed on the tang 188 between the washers 194, 196. In operation, the washer 196 bears against the ends of the plates 170, 180 thereby yieldably urging the slider 176 in the direction the tang 188 extends. The slider 176 would slide in that direction if it were not for the presence of the hose 160 that extends through the hole 178 in the slider. The compression spring 192 thus preloads the edge 202 against the rubber hose 160. The adjustable lock nut 198 permits the preloading force to be adjusted. The chain 200 connects the slider 176 with a stationary part of the apparatus, which in the preferred embodiment is the carriage structure 94 within which the separation chamber reciprocates. In the preferred embodiment, the effective length of the chain 200 is adjustable by means of a lag bolt.

The operation of the pinch valve of FIG. 4 can best be understood by recalling that the entire pinch valve structure is attached to the reciprocating separation chamber 100 and is connected to the stationary carriage structure 94 only by the chain 200. As will be seen below, the effective length of the chain 200 is crucial for proper operation of the valve. When the separation chamber is in its rearmost position relative to the carriage structure, the concentrates on the floor of the separation chamber have just finished lurching a short distance towards the front of the separation chamber. Accordingly, few if any of the concentrates are in the vicinity of the concentrate outlet fixture 116. Therefore, if the pinch valve were to open at that time, only a relatively small amount of concentrate and a relatively large amount of water would be discharged. When the separation chamber is in its rearmost position in its cycle of reciprocation, there is slack in the chain 200, and the preloading force supplied by the compression spring 192 causes the edge 202 to bear against the rubber hose 160, which is held by the plates 170, 180, thereby to pinch off the flow through the rubber hose 160.

This conditions prevails as the separation chamber begins its forward movement, and persists during most of the forward movement of the separation chamber. Because forward motion of the separation chamber tends to cause the concentrates on the floor of the chamber to migrate toward the rear of the chamber, the quantity of concentrates in the vicinity of the concentrate outlet fixture 116 increases during the forward motion of the separation chamber and reaches a maximum when the separation chamber has reached its maximum forward position with respect to the stationary carriage structure 94. This then is the preferred point in the cycle of reciprocation for opening the pinch valve, because the ratio of concentrate to water in the discharge will be highest at this point. Of course, to provide more than just an instantaneous discharge, the pinch valve must open as the separation chamber approaches its maximum forward position and must remain open for a short time after the maximum forward position has been reached.

This desirable result is achieved by adjustment of the effective length of the chain 200 so that as the separation chamber approaches its maximum forward position, the slack in the chain 200 has been taken up, and thereafter as the separation chamber continues its forward motion, the chain 200 pulls the slider 176 rearwardly, overcoming the resistance of the preloading spring 192, and relieving the pinching of the hose 160.

When the pinching is relieved, the pressurized mixture of concentrates and water is discharged through the hose 160. This discharge continues as the separation chamber approaches and reaches its maximum forward excursion and after that, for an equal distance as the separation chamber begins to move rearwardly. Thus, it is seen that the discharge is centered on the maximum forward position of the separation chamber, and this optimizes the ratio of concentrates to water in a discharge. The total volume of the discharge can be adjusted by altering the effective length of the chain 200 to increase or decrease the duty cycle of the valve. The preloading of the rubber hose 160 is adjusted by means of the adjustable lock nut 198 to produce a sufficient preloading force to cut off the discharge at all other points in the cycle of reciprocation of the separation chamber. Because the discharge is centered on the maximum forward position of the separation chamber, it is seen that the pinch valve of FIG. 4 permits the amount of concentrates to be maximized during the discharge while the loss of pressure in the separation chamber is minimized. In a preferred embodiment, the rubber hose 160 consists of a length of surgical tubing.

Thus, there has been described a novel separation system that includes a helical concentrator up through which a suspension is pumped in a unidirectional pulsating flow by a diaphragm pump, and this helical concentrator is used to pressurize and supply a preconcentrated suspension to a novel separator that includes a novel feed system, an undulating chamber, a helical concentrator that receives the discharged lights and wash water, and that further includes a unique pinch valve for discharging the heavier concentrates with minimum loss of separation chamber pressure. The apparatus of the present invention has been tested and the results demonstrate that even the very finest suspensions may be accurately separated through its use.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. Valve apparatus for use on a reciprocating member that executes, relative to a stationary member, a cycle of motion between two extreme positions, for discharging a liquid only during that part of the cycle of motion when the reciprocating member is near one of its extreme positions, said valve apparatus comprising in combination:

two plates mounted to the reciprocating member in spaced relationship and parallel to each other, each plate having a restraining edge, the restraining edges being parallel;

a third plate slidably mounted in the space between said two plates, and slidable in the direction of motion, and including an aperture that extends beyond the restraining edges of said two plates;

a resilient tube extending in a direction perpendicular to the direction of motion and extending through the aperture in said third plate, so that the restraining edges of said two plates substantially touch one side of said resilient tube and an edge of the aperture is situated on the opposite side of said resilient tube;

preloading means mounted on the reciprocating member and connected to said third plate to yieldably bias said edge of the aperture against said resilient tube with sufficient preloading force to close off said resilient tube between the edge of the aperture and the restraining edges of said two plates; and, releasing means connecting said third plate to the stationary member and, during a portion of the cycle of motion including an extreme position, acting upon said third plate in a direction opposite the preloading force to overcome said preloading force and thereby to permit said resilient tube to assume its normal shape, whereby the liquid is discharged through said resilient tube only during that portion of the cycle of motion.

2. The valve apparatus of claim 1 wherein said preloading means further comprise means for adjusting the force with which said edge of the aperture is yieldably biased against said resilient tube.

3. The valve apparatus of claim 1, wherein said releasing means further comprise means for adjusting the position in the cycle of motion at which said releasing means begin to overcome said preloading force.

* * * * *